(12) United States Patent
Aramaki

(10) Patent No.: US 11,765,469 B2
(45) Date of Patent: Sep. 19, 2023

(54) IMAGE CAPTURING APPARATUS, DEVICE, CONTROL METHOD, AND COMPUTER-READABLE STORAGE MEDIUM

(71) Applicant: CANON KABUSHIKI KAISHA, Tokyo (JP)

(72) Inventor: Yuji Aramaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/184,925

(22) Filed: Feb. 25, 2021

(65) Prior Publication Data

US 2021/0274095 A1    Sep. 2, 2021

(30) Foreign Application Priority Data

Feb. 28, 2020    (JP) .................................. 2020-033755

(51) Int. Cl.
| | |
|---|---|
| *H04N 23/80* | (2023.01) |
| *H04N 23/661* | (2023.01) |
| *H04N 23/90* | (2023.01) |
| *H04N 23/617* | (2023.01) |
| *H04N 1/00* | (2006.01) |

(52) U.S. Cl.
CPC ........... *H04N 23/80* (2023.01); *H04N 23/661* (2023.01)

(58) Field of Classification Search
CPC .......... H04N 5/23229; H04N 5/23206; H04N 5/23225; H04N 5/247; H04N 1/00249
See application file for complete search history.

(56) References Cited

U.S. PATENT DOCUMENTS

| | | |
|---|---|---|
| 9,728,077 B1 | 8/2017 | Fu et al. |
| 10,691,012 B2 | 6/2020 | Ise |
| 2004/0145660 A1 | 7/2004 | Kusaka |

(Continued)

FOREIGN PATENT DOCUMENTS

| | | |
|---|---|---|
| CN | 109993212 A | 7/2019 |
| EP | 1860869 A1 | 11/2007 |

(Continued)

OTHER PUBLICATIONS

Extended European Search Report issued by the European Patent Office dated Dec. 16, 2021 in corresponding EP Patent Application No. 21159171.4.

(Continued)

*Primary Examiner* — Christopher K Peterson
(74) *Attorney, Agent, or Firm* — CARTER, DELUCA & FARRELL LLP

(57) ABSTRACT

An image capturing apparatus including a mounting part capable of attaching/detaching a device obtains, if a device mounted in the mounting part has a function of executing analysis processing for data obtained by the image capturing apparatus, from the device, information of a setting concerning processing to be executed by the image capturing apparatus to cause the device to execute the analysis processing for the data, executes, based on the obtained information of the setting, the processing to be executed by the image capturing apparatus, and performs output based on a result of the analysis processing and a result of the processing.

21 Claims, 9 Drawing Sheets

(56) References Cited

U.S. PATENT DOCUMENTS

| | | | |
|---|---|---|---|
| 2006/0001746 A1* | 1/2006 | Watanabe | H04N 5/907 386/E5.067 |
| 2006/0114338 A1 | 6/2006 | Rothschild | |
| 2007/0055823 A1 | 3/2007 | Jo et al. | |
| 2007/0168652 A1 | 7/2007 | Mylly et al. | |
| 2011/0304706 A1 | 12/2011 | Border et al. | |
| 2013/0113944 A1* | 5/2013 | Fukushima | H04N 5/23206 348/207.1 |
| 2014/0152777 A1 | 6/2014 | Galor et al. | |
| 2015/0015734 A1 | 1/2015 | Matsuo | |
| 2015/0242149 A1 | 8/2015 | Kim et al. | |
| 2015/0248368 A1 | 9/2015 | Otsuka | |
| 2015/0379725 A1 | 12/2015 | Kuwahara et al. | |
| 2016/0198093 A1* | 7/2016 | Ito | H04N 5/23206 348/333.02 |
| 2017/0206424 A1 | 7/2017 | Uchida et al. | |
| 2019/0187194 A1 | 6/2019 | Sugahara | |
| 2020/0045243 A1 | 2/2020 | Aramaki et al. | |
| 2020/0234412 A1 | 7/2020 | Ise | |
| 2020/0389579 A1 | 12/2020 | Ise | |
| 2021/0092322 A1 | 3/2021 | Aramaki | |
| 2021/0136249 A1 | 5/2021 | Aramaki et al. | |
| 2021/0274079 A1 | 9/2021 | Ise | |
| 2021/0274086 A1 | 9/2021 | Ise | |
| 2021/0306591 A1 | 9/2021 | Maeda | |

FOREIGN PATENT DOCUMENTS

| | | |
|---|---|---|
| JP | 2001147254 A | 5/2001 |
| JP | 2005-345802 A | 12/2005 |
| JP | 2011168099 A | 9/2011 |
| JP | 2018-157601 A | 10/2018 |
| WO | 0127763 A1 | 4/2001 |
| WO | 2016/031720 A1 | 3/2016 |
| WO | 2017104218 A1 | 6/2017 |

OTHER PUBLICATIONS

Non-Final Office Action issued by the U.S. Patent and Trademark Office dated Jun. 30, 2022 in related U.S. Appl. No. 17/184,869.
Partial European Search Report issued by the European Patent Office dated Jul. 19, 2021 in corresponding EP Patent Application No. 21159170 6.
Extended European Search Report issued by the European Patent Office dated Jan. 3, 2022 in corresponding EP Patent Application No. 21159170.6.
Partial European Search Report issued by the European Patent Office dated Jul. 23, 2021 in corresponding EP Patent Application No. 21159171.4.
Redmon, J. et al., "YOLO9000: Better Faster Stronger" Computer Vision and Pattern Recognition (CVPR), arXiv: 1612.08242v1 (Dec. 2016) pp. 1-9.
Final Office Action issued by the USPTO in related U.S. Appl. No. 17/184,899, dated Jun. 30, 2023.

* cited by examiner

IMAGE CAPTURING APPARATUS, DEVICE, CONTROL METHOD, AND COMPUTER-READABLE STORAGE MEDIUM

BACKGROUND OF THE INVENTION

Field of the Invention

The present invention relates to a technique of improving convenience in a system in which a detachable device capable of executing a predetermined function is used.

Description of the Related Art

In recent years, image processing such as image analysis of performing object detection and tracking or performing attribute estimation, and estimation of the number of objects based on the result of such image analysis is performed in various scenes using images captured by a monitoring camera. Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by, for example, an arithmetic apparatus arranged in a camera main body. When the arithmetic apparatus is arranged in a detachable device such as a USB, the detachable device can execute at least a part of processing.

In the apparatus on which the detachable device can be mounted, it is important to perform control of improving convenience when a user uses the apparatus in accordance with the presence/absence of the mounting of the detachable device. Japanese Patent Laid-Open No. 2018-157601 describes a technique of, in an electronic device to/from which an image capturing apparatus can be attached/detached, improving usability by changing a user operation acceptance mode in accordance with whether the image capturing apparatus is separated from the electronic device.

Japanese Patent Laid-Open No. 2018-157601 describes only changing control on the image capturing apparatus side based on whether a detachable device is mounted, and does not examine convenience in a case in which there are a variety of functions to be executed by the detachable device.

The present invention provides a technique of appropriately controlling the operation of an apparatus in which a detachable device is mounted in accordance with processing executable by the detachable device.

SUMMARY OF THE INVENTION

According to one aspect of the present invention, there is provided an image capturing apparatus including a mounting part capable of attaching/detaching a device, comprising: an obtaining unit configured to, if a device mounted in the mounting part has a function of executing analysis processing for data obtained by the image capturing apparatus, obtain, from the device, information of a setting concerning processing to be executed by the image capturing apparatus to cause the device to execute the analysis processing for the data; an execution unit configured to execute, based on the obtained information of the setting, the processing to be executed by the image capturing apparatus; and an output unit configured to perform output based on a result of the analysis processing and a result of the processing by the execution unit.

According to another aspect of the present invention, there is provided a device mounted in an apparatus including a mounting part capable of attaching/detaching the device, comprising: a processing unit capable of executing analysis processing for data obtained by an image capturing apparatus if the device is mounted in the image capturing apparatus including the mounting part; and a notification unit configured to notify the image capturing apparatus of information of a setting concerning processing to be executed by the image capturing apparatus to execute the analysis processing for the data.

Further features of the present invention will become apparent from the following description of exemplary embodiments (with reference to the attached drawings).

DESCRIPTION OF THE EMBODIMENTS

Figure 1:
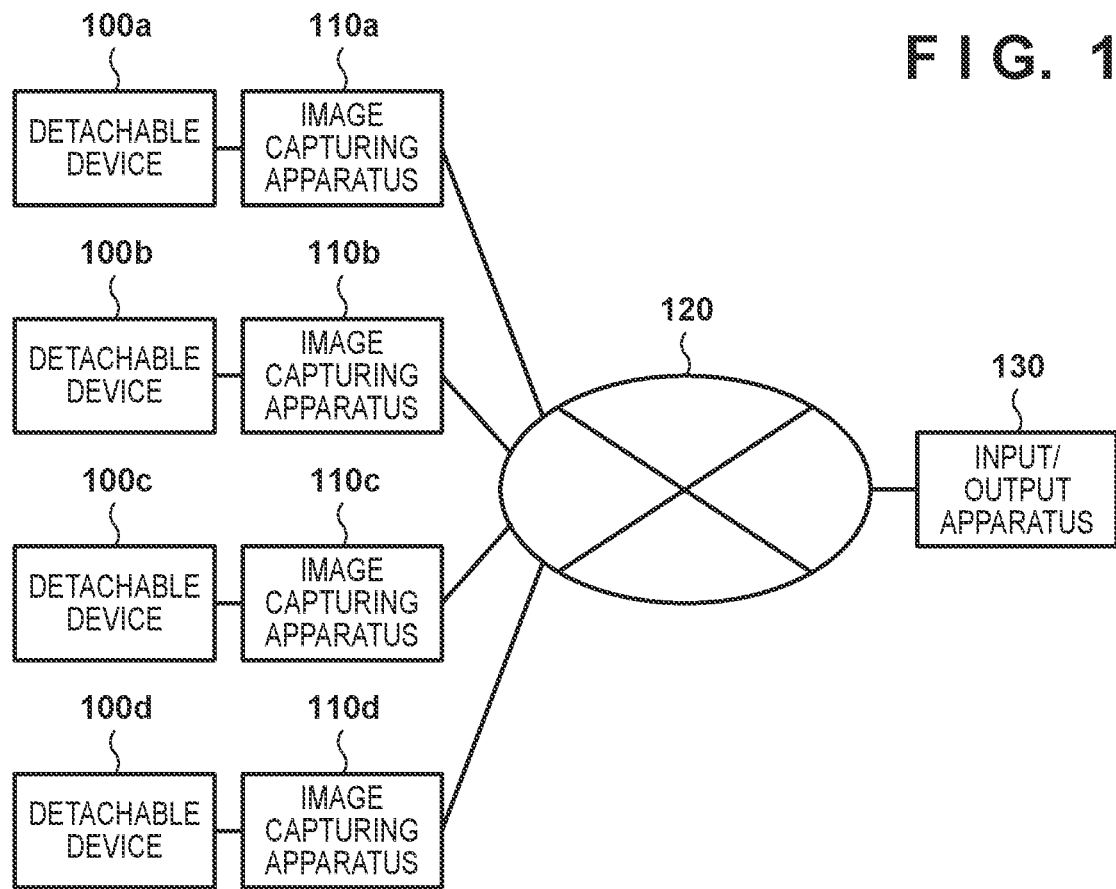
FIG. 1 is a block diagram showing an example of a system arrangement.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<System Arrangement>

FIG. 1 shows an example of the arrangement of an image analysis system according to this embodiment. As an example, a case in which this system is a specific person tracking system will be described below. However, the present invention is not limited to this, and the following argument can be applied to an arbitrary system for analyzing an image and performing predetermined information output. This system is configured to include image capturing apparatuses 110a to 110d, a network 120, and an input/output apparatus 130. Note that the image capturing apparatuses 110a to 110d each include a slot to/from which a device capable of recording, for example, a captured image can be attached/detached, and when the detachable devices 100a to 100d are inserted into the slots, the image capturing apparatuses 110a to 110d are connected to the detachable devices 100a to 100d. Note that the detachable devices 100a to 100d will be referred to as "detachable devices 100", and the image capturing apparatuses 110a to 110d will be referred to as "image capturing apparatuses 110" hereinafter.

The detachable device 100 is an arithmetic device attachable/detachable to/from the image capturing apparatus 110. As an example, the detachable device 100 is a device with a predetermined processing circuit mounted in an SD card. The detachable device 100 is configured to be inserted as a whole into the image capturing apparatus 110 in a form of, for example, an SD card, and can therefore be configured to be connectable to the image capturing apparatus 110 without making any portion project from the image capturing apparatus 110. Alternatively, the detachable device 100 may be configured such that, for example, a half or more of it can be inserted into the image capturing apparatus 110, and may therefore be configured to be connectable to the image capturing apparatus 110 while making a portion project a little from the image capturing apparatus 110. This can prevent the detachable device 100 from interfering with an obstacle such as a wiring and raise the convenience when using the device. In addition, since an SD card slot is prepared in a lot of existing image capturing apparatuses 110 such as a network camera, the detachable device 100 can provide an extension function to the existing image capturing apparatus 110. Note that other than the form of an SD card, the detachable device 100 may be configured to be mounted in the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted in a USB socket of the image capturing apparatus 110. The predetermined processing circuit is implemented by, for example, an FPGA (Field Programmable Gate Array) programmed to execute predetermined processing but may be implemented in another form.

The image capturing apparatus 110 is an image capturing apparatus such as a network camera. In this embodiment, the image capturing apparatus 110 incorporates an arithmetic apparatus capable of processing a video but is not limited to this. For example, an external computer such as a PC (Personal Computer) connected to the image capturing apparatus 110 may exist, and the combination may be handled as the image capturing apparatus 110. Additionally, in this embodiment, the detachable devices 100 are mounted in all the image capturing apparatuses 110. Note that FIG. 1 shows four image capturing apparatuses 110, and the detachable devices mounted in these. The number of combinations of devices may be three or less, or five or more. When the detachable device 100 having an image analysis processing function is mounted in the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/sophisticated by mounting the detachable device 100 including an arithmetic apparatus in the image capturing apparatus 110.

The input/output apparatus 130 is an apparatus that performs acceptance of input from a user and output of information (for example, display of information) to the user. In this embodiment, for example, the input/output apparatus 130 is a computer such as a PC, and information is input/output by executing a browser or a native application installed in the computer by an internal processor.

The image capturing apparatuses 110 and the input/output apparatus 130 are communicably connected via the network 120. The network 120 is configured to include a plurality of routers, switches, cables, and the like, which satisfy the communication standard of, for example. Ethernet*. In this embodiment, the network 120 can be an arbitrary network that enables communication between the image capturing apparatus 110 and the input/output apparatus 130, and can be constructed by an arbitrary scale and arrangement and a communication standard to comply with. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

In this embodiment, focusing on the fact that processing to be executed by the image capturing apparatus 110 changes in accordance with processing executed by the detachable device 100, a technique for improving convenience will be described. More specifically, the size of image data requested by processing executed by the detachable device 100 is assumed to change for each processing. In this case, if the image capturing apparatus 110 generates image data of a predetermined size and outputs it to the detachable device 100, the detachable device 100 cannot directly execute image analysis processing for the image data. At this time, if the image capturing apparatus 110 does not have a capability of changing the size of image data, processing cannot be performed. Additionally, for example, if an object is detected by image analysis processing of the detachable device 100, processing in which highlight display of the object is requested and processing in which abstraction of the object is requested can exist. In this case, if the image capturing apparatus 110 executes processing of uniformly highlighting the detected object, an assumed output cannot be obtained. For this reason, in this embodiment, the image capturing apparatus 110 obtains, from the detachable device 100, information of settings of processing to be executed by the image capturing apparatus 110 to cause the detachable device 100 to execute image analysis processing of the image data. The arrangement and the procedure of the operation of an apparatus that executes such processing will be described below.

<Apparatus Arrangement>

(Arrangement of Image Capturing Apparatus)

Figure 2:
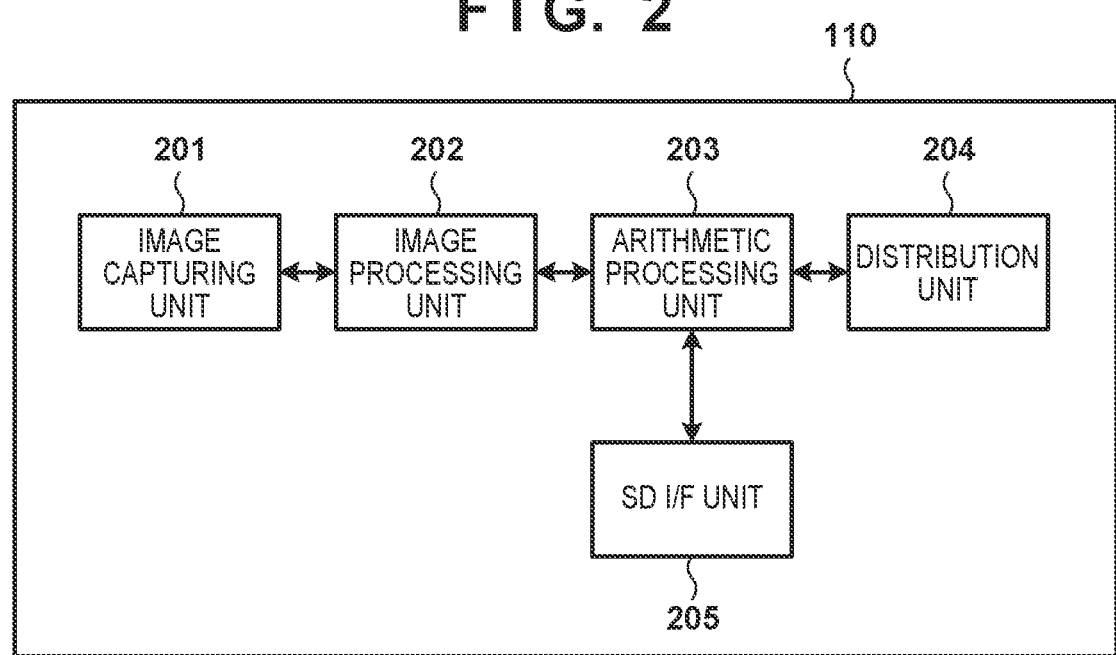
FIG. 2 is a block diagram showing an example of the hardware arrangement of an image capturing apparatus.

The arrangement of the image capturing apparatus 110 will be described next. FIG. 2 is a block diagram showing an example of the hardware arrangement of the image capturing apparatus 110. As the hardware arrangement, the image capturing apparatus 110 includes, for example, an image capturing unit 201, an image processing unit 202, an arithmetic processing unit 203, a distribution unit 204, and an SD I/F unit 205. Note that/F is an abbreviation of interface.

The image capturing unit 201 is configured to include a lens portion configured to form an image of light, and an image capturing element that performs analog signal conversion according to the formed image of light. The lens portion has a zoom function of adjusting an angle of view, a stop function of adjusting a light amount, and the like. The image capturing element has a gain function of adjusting sensitivity when converting light into an analog signal. These functions are adjusted based on set values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit set values to the lens portion and the image capturing element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 can determine allocation concerning which one of the image capturing apparatus 110 and the detachable device 100 should execute each portion of processing to be executed in the above-described system, and execute processing corresponding to the allocation. Details of processing contents and processing allocation will be described later. The image received from the image processing unit 202 is transferred to the distribution unit 204 or the SD I/F unit 205. The data of the processing result is also transferred to the distribution unit 204.

The distribution unit 204 is configured to include a network distribution engine and, for example, peripheral devices such as a RAM and an ETH PHY module. The ETH PHY module is a module that executes processing of the physical (PHY) layer of Ethernet. The distribution unit 204 converts the image data or the data of the processing result obtained from the arithmetic processing unit 203 into a format distributable to the network 120, and outputs the converted data to the network 120. The SD I/F unit 205 is an interface portion used to connect the detachable device 100, and is configured to include, for example, a power supply, and a mounting part such as an attaching/detaching socket used to attach/detach the detachable device 100. Here, the SD I/F unit 205 is configured in accordance with the SD standard formulated by the SD Association. Communication between the detachable device 100 and the image capturing apparatus 110, such as transfer of an image obtained from the arithmetic processing unit 203 to the detachable device 100 or data obtaining from the detachable device 100, is performed via the SD I/F unit 205.

Figure 3:
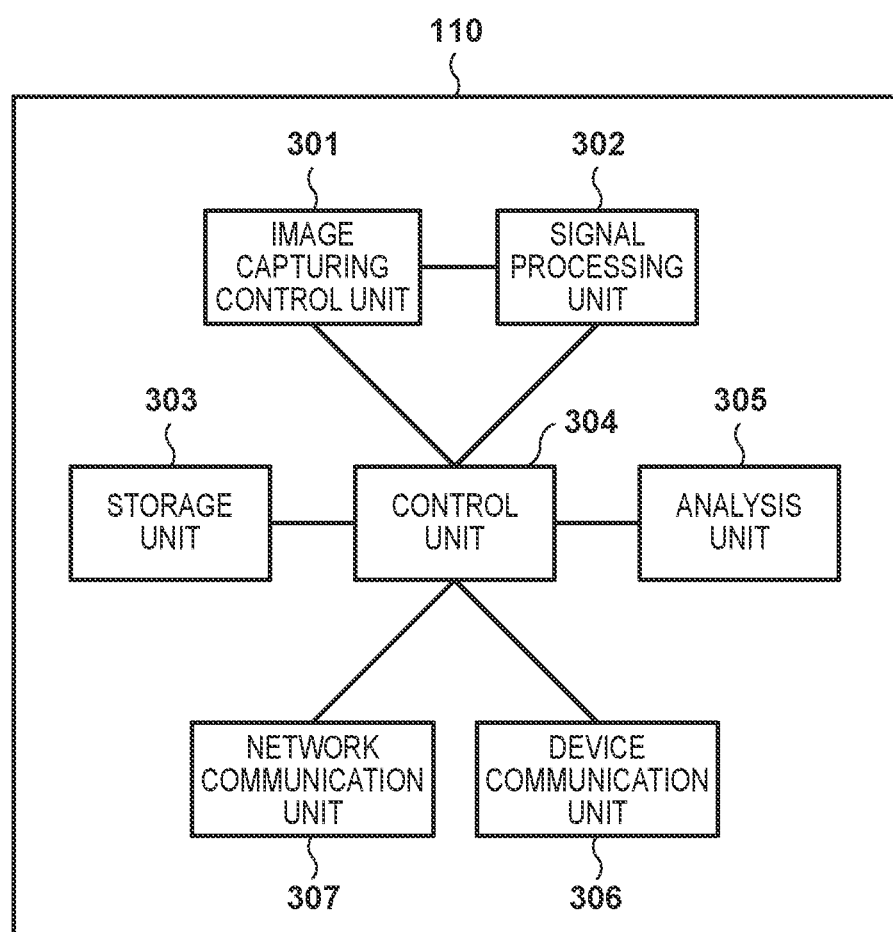
FIG. 3 is a block diagram showing an example of the functional arrangement of the image capturing apparatus.

FIG. 3 shows an example of the functional arrangement of the image capturing apparatus 110. The image capturing apparatus 110 includes, as its functions, for example, an image capturing control unit 301, a signal processing unit 302, a storage unit 303, a control unit 304, an analysis unit 305, a device communication unit 306, and a network communication unit 307.

The image capturing control unit 301 executes control of capturing the peripheral environment via the image capturing unit 201. The signal processing unit 302 performs predetermined processing for the image captured by the image capturing control unit 301, thereby generating data of the captured image. The data of the captured image will simply be referred to as the "captured image" hereinafter. The signal processing unit 302, for example, encodes the image captured by the image capturing control unit 301. The signal processing unit 302 performs encoding for a still image using, for example, an encoding method such as JPEG (Joint Photographic Experts Group). The signal processing unit 302 performs encoding for a video using an encoding method such as H.264/MPEG-4 AVC (to be referred to as "H.264" hereinafter) or HEVC (High Efficiency Video Coding). The signal processing unit 302 may encode an image using an encoding method selected by the user from a plurality of encoding methods set in advance via, for example, an operation unit (not shown) of the image capturing apparatus 110.

The storage unit 303 stores a list (to be referred to as a "first processing list" hereinafter) of analysis processing executable by the analysis unit 305 and a list of post-processes for a result of analysis processing. The storage unit 303 also stores a result of analysis processing to be described later. Note that in this embodiment, processing to be executed is analysis processing. However, arbitrary processing may be executed, and concerning processing associated with the processing to be executed, the storage unit 303 may store the first processing list and the list of post-processes. The control unit 304 controls the signal processing unit 302, the storage unit 303, the analysis unit 305, the device communication unit 306, and the network communication unit 307 to execute predetermined processing.

The analysis unit 305 selectively executes at least one of pre-analysis processing, analysis processing, and post-analysis processing to be described later for a captured image. Pre-analysis processing is processing to be executed for a captured image before analysis processing to be described later is executed. In the pre-analysis processing according to this embodiment, as an example, processing of dividing a captured image to create divided images (to be referred to as "image division processing" hereinafter) is executed. Analysis processing is processing of outputting information obtained by analyzing an input image. In the analysis processing according to this embodiment, as an example, processing of receiving a divided image obtained by pre-analysis processing, executing at least one of human body detection processing, face detection processing, and vehicle detection processing, and outputting the analysis processing result is executed. The analysis processing can be processing configured to output the position of an object in a divided image using a machine learning model that has learned to detect an object included in an image using, for example, the technique in J. Redmon and A. Farhadi "YOLO9000: Better Faster Stronger" Computer Vision and Pattern Recognition (CVPR) 2016. Post-analysis processing is processing to be executed after analysis processing is executed. In the post-analysis processing according to this embodiment, as an example, processing of outputting, as a processing result, a value obtained by adding the numbers of objects detected in the divided images based on the analysis processing result for each divided image is executed. Note that the analysis processing may be processing of detecting an object in an image by performing pattern matching and outputting the position of the object.

The device communication unit 306 performs communication with the detachable device 100. The device communication unit 306 converts input data into a format processible by the detachable device 100, and transmits data obtained by the conversion to the detachable device 100. In addition, the device communication unit 306 receives data from the detachable device 100, and converts the received data into a format processible by the image capturing apparatus 110. In this embodiment, as the conversion processing, the device communication unit 306 executes processing of converting a decimal between a floating point format and a fixed point format. However, the present invention is not limited to this, and another process may be executed by the device communication unit 306. Additionally, in this embodiment, the device communication unit 306 transmits a command sequence determined in advance within the range of the SD standard to the detachable device 100, and receives a response from the detachable device 100, thereby performing communication with the detachable device 100. The network communication unit 307 performs communication with the input/output apparatus 130 via the network 120.

(Arrangement of Detachable Device)

Figure 4:
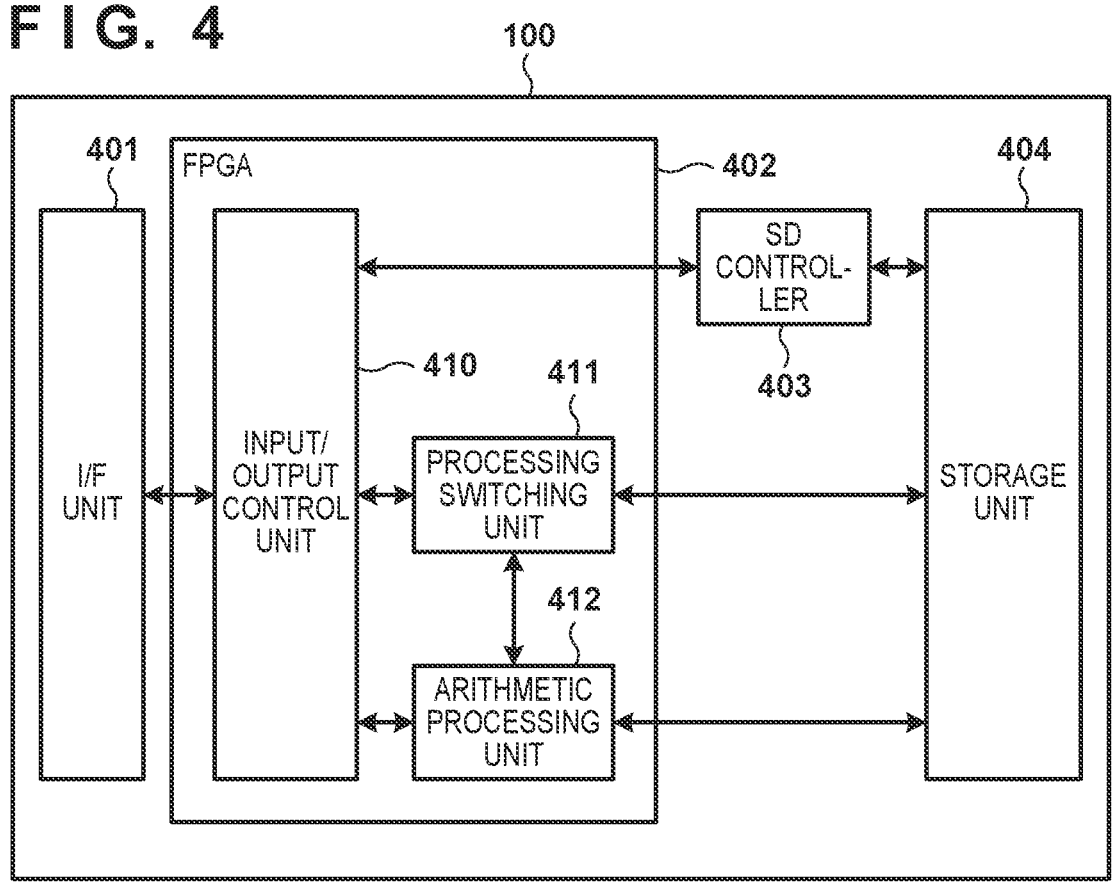
FIG. 4 is a block diagram showing an example of the hardware arrangement of a detachable device.

FIG. 4 is a block diagram showing an example of the hardware arrangement of the detachable device 100. As an example, the detachable device 100 is configured to include an I/F unit 401, an FPGA 402, an SD controller 403, and a storage unit 404. The detachable device 100 is formed into a shape that can be inserted/removed into/from the attaching/detaching socket of the SD I/F unit 205 provided in the image capturing apparatus 110, that is, a shape complying with the SD standard.

The I/F unit 401 is an interface portion used to connect an apparatus such as the image capturing apparatus 110 and the detachable device 100. The I/F unit 401 is configured to include, for example, an electrical contact terminal that receives supply of power from the image capturing apparatus 110 and generates and distributes a power supply to be used in the detachable device 100, and the like. Concerning items defined in (complying with) the SD standard, the I/F unit 401 complies with that, like the SD I/F unit 205 of the image capturing apparatus 110. Reception of images and setting data from the image capturing apparatus 110 and transmission of data from the FPGA 402 to the image capturing apparatus 110 are executed via the I/F unit 401.

The FPGA 402 is configured to include an input/output control unit 410, a processing switching unit 411, and an arithmetic processing unit 412. The FPGA 402 is a kind of semiconductor device capable of repetitively reconfiguring an internal logic circuit structure. By processing implemented by the FPGA 402, a processing function can be added (provided) to the apparatus in which the detachable device 100 is mounted. Additionally, since the logic circuit structure can be changed later by the reconfiguration function of the FPGA 402, when the detachable device 100 is mounted in, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be executed. The FPGA 402 is activated by writing, from a dedicated I/F, setting data including the information of a logic circuit structure to be generated or reading out the setting data from the dedicated I/F. In this embodiment, the setting data is held in the storage unit 404. When powered on, the FPGA 402 reads out the setting data from the storage unit 404 and generates and activates a logic circuit. However, the present invention is not limited to this. For example, the image capturing apparatus 110 may write the setting data in the FPGA 402 via the I/F unit 401 by implementing a dedicated circuit in the detachable device.

The input/output control unit 410 is configured to include a circuit used to transmit/receive an image to/from the image capturing apparatus 110, a circuit that analyzes a command received from the image capturing apparatus 110, a circuit that controls based on a result of analysis, and the like. Commands here are defined by the SD standard, and the input/output control unit 410 can detect some of them. Details of the functions will be described later. The input/output control unit 410 controls to transmit an image to the SD controller 403 in storage processing and transmit an image to the arithmetic processing unit 412 in image analysis processing. If the setting data of switching of processing is received, the input/output control unit 410 transmits the setting data to the processing switching unit 411. The processing switching unit 411 is configured to include a circuit configured to obtain the information of the image analysis processing function from the storage unit 404 based on the setting data received from the image capturing apparatus 110 and write the information in the arithmetic processing unit 412. The information of the image analysis processing function includes setting parameters representing, for example, the order and types of operations processed in the arithmetic processing unit 412, the coefficients of operations, and the like. The arithmetic processing unit 412 is configured to include a plurality of arithmetic circuits needed to execute the image analysis processing function. The arithmetic processing unit 412 executes each arithmetic processing based on the information of the image analysis processing function received from the processing switching unit 411, transmits the processing result to the image capturing apparatus 110, and/or records the processing result in the storage unit 404. As described above, the FPGA 402 extracts the setting data of an execution target processing function included in setting data corresponding to a plurality of processing functions held in advance, and rewrites processing contents to be executed by the arithmetic processing unit 412 based on the extracted setting data. This allows the detachable device 100 to selectively execute at least one of the plurality of processing functions. In addition, by appropriately adding setting data of processing to be newly added, latest processing can be executed on the side of the image capturing apparatus 110.

Note that holding a plurality of setting data corresponding to a plurality of processing functions will be referred to as holding a plurality of processing functions hereinafter. That is, even in a state in which the FPGA 402 of the detachable device 100 is configured to execute one processing function, if the processing contents of the arithmetic processing unit 412 can be changed by setting data for another processing function, this will be expressed as holding a plurality of processing functions.

The SD controller 403 is a known control IC (Integrated Circuit) as defined by the SD standard, and executes control of a slave operation of an SD protocol and control of data read/write for the storage unit 404. The storage unit 404 is formed by, for example, a NAND flash memory, and stores various kinds of information such as storage data written from the image capturing apparatus 110, the information of the image analysis processing function written in the arithmetic processing unit 412, and setting data of the FPGA 402.

Figure 5:
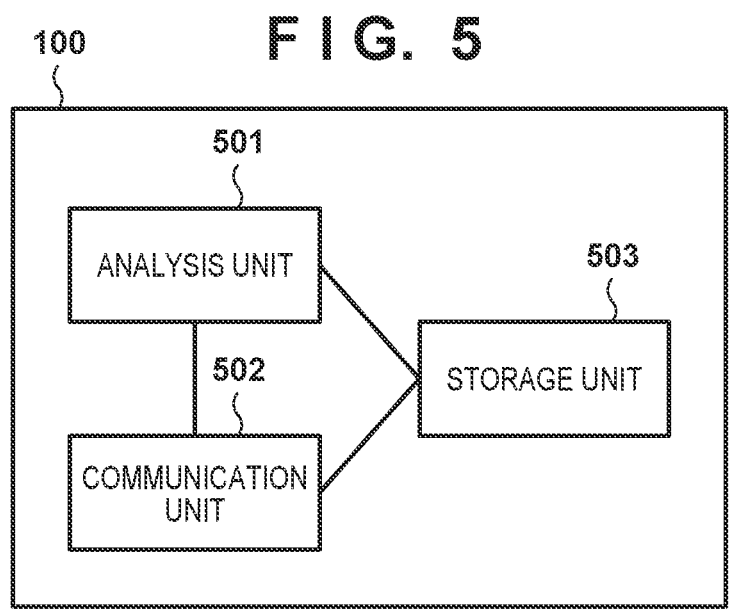
FIG. 5 is a block diagram showing an example of the functional arrangement of the detachable device.

FIG. 5 shows an example of the functional arrangement of the detachable device 100. The detachable device 100 includes, as its functional arrangement, for example, an analysis unit 501, a communication unit 502, and a storage unit 503. The analysis unit 501 executes analysis processing for an image. For example, if an analysis processing setting request is input, the analysis unit 501 executes setting to set the input analysis processing in an executable state. If an image is input, the analysis unit 501 executes the analysis processing set in the executable state for the input image. In this embodiment, executable analysis processing includes human body detection processing and face detection processing but is not limited to these. For example, it may be processing (face authentication processing) of determining whether a person stored in advance is included in an image. For example, if the degree of matching between the image feature of a person stored in advance and the image feature of a person detected from an input image is calculated, and the degree of matching is equal to or larger than a threshold, it is determined that the person is the person stored in advance. Alternatively, it may be processing of superimposing a predetermined mask image or performing mosaic processing on a person detected from an input image for the purpose of privacy protection. It may be processing of detecting, using a learning model that has learned a specific action of a person by machine learning, whether a person in an image is taking the specific action. Furthermore, it may be processing of determining what kind of region a region in an image is. It may be processing of determining, using, for example, a learning model that has learned buildings, roads, persons, sky and the like by machine learning, what kind of region a region in an image is. As described above, executable analysis processing can be applied to both image analysis processing using machine learning and image analysis processing without using machine learning. Each analysis processing described above may be executed not independently by the detachable device 100 but in cooperation with the image capturing apparatus 110. The communication unit 502 performs communication with the image capturing apparatus 110 via the/F unit 401.

The storage unit 503 stores information such as the setting contents of pre-analysis processing and post-analysis processing. The setting contents of pre-analysis processing and post-analysis processing can be, for example, the types and parameters of pre-analysis processing and post-analysis processing. The type of pre-analysis processing can be, for example, at least one of image division processing, color space conversion processing, and image size conversion processing. Note that processing other than these processes may be used as pre-analysis processing. The parameters of image division processing include, for example, the size of a divided image after division. The parameters of color space conversion processing include, for example, the color space of the conversion destination. The parameters of image size conversion processing include, for example, at least one of the image size after conversion and the type of a conversion algorithm. The types of post-analysis processing can include processing of totaling numerical values output as results of analysis processing, superimposition processing of alpha-blending an image output as a result of analysis processing with an image before analysis, and drawing processing of drawing a graphic output as a result of analysis processing on an image before analysis. The parameters of superimposition processing include, for example, an alpha value, a color to be blended, and a combination thereof. The parameters of drawing processing can include, for example, the shape of a graphic to be drawn, the thickness of a frame of a graphic to be drawn, the color of a frame of a graphic to be drawn, and a combination thereof.

Figure 6:
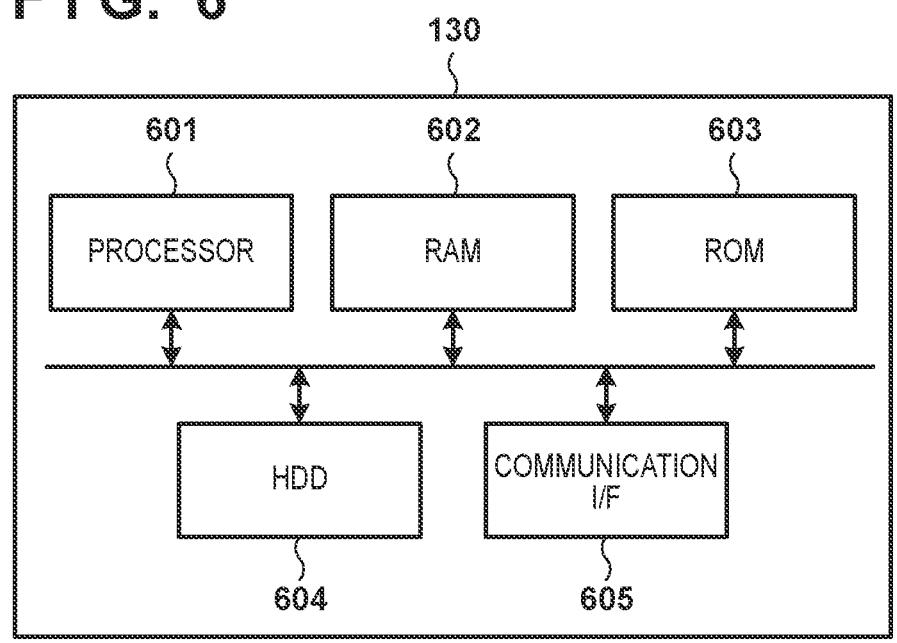
FIG. 6 is a block diagram showing an example of the hardware arrangement of an input/output apparatus.

FIG. 6 shows an example of the hardware arrangement of the input/output apparatus 130. The input/output apparatus 130 is formed as a computer such as a general PC, and is configured to include, for example, a processor 601 such as a CPU, memories such as a RAM 602 and a ROM 603, a storage device such as an HDD 604, and a communication I/F 605, as shown in FIG. 6. The input/output apparatus 130 can execute various kinds of functions by executing, by the processor 601, programs stored in the memories and the storage device.

Figure 7:
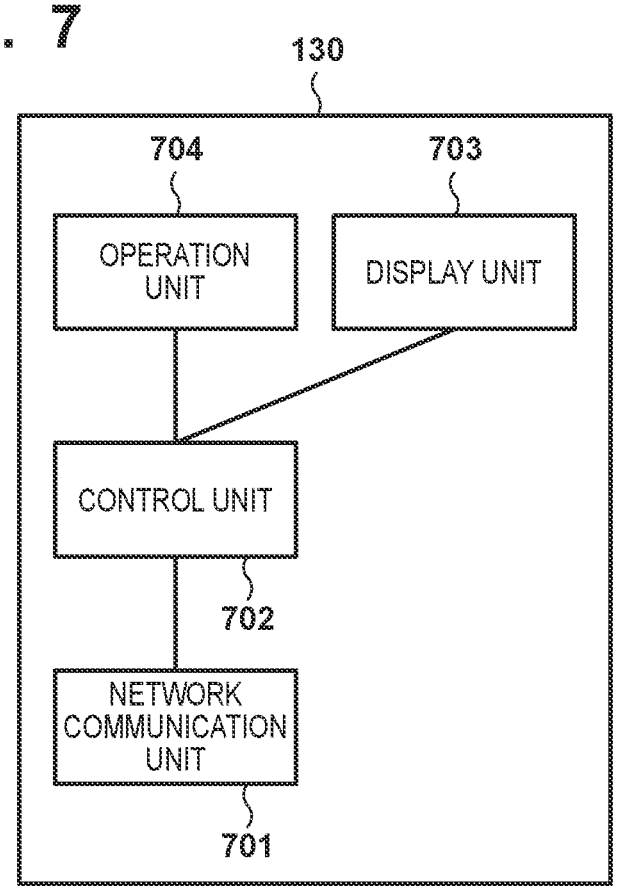
FIG. 7 is a block diagram showing an example of the functional arrangement of the input/output apparatus.

FIG. 7 shows an example of the functional arrangement of the input/output apparatus 130 according to this embodiment. The input/output apparatus 130 includes, as its functional arrangement, for example, a network communication unit 701, a control unit 702, a display unit 703, and an operation unit 704. The network communication unit 701 is connected to, for example, the network 120 and executes communication with an external apparatus such as the image capturing apparatus 110 via the network 120. Note that this is merely an example and, for example, the network communication unit 701 may be configured to establish direct communication with the image capturing apparatus 110 and communicate with the image capturing apparatus 110 without intervention of the network 120 or other apparatus. The control unit 702 controls such that the network communication unit 701, the display unit 703, and the operation unit 704 execute processing of their own. The display unit 703 presents information to the user via, for example, a display. In this embodiment, a result of rendering by a browser is displayed on a display, thereby presenting information to the user. Note that information may be presented by a method such as an audio or a vibration other than screen display. The operation unit 704 accepts an operation from the user. In this embodiment, the operation unit 704 is a mouse or a keyboard, and the user operates these to input a user operation to the browser. However, the operation unit 704 is not limited to this and may be, for example, another arbitrary device capable of detecting a user's intention, such as a touch panel or a microphone.

<Procedure of Processing>

An example of the procedure of processing executed in the system will be described next. Note that processing executed by the image capturing apparatus 110 in the following processes is implemented by, for example, by a processor in the arithmetic processing unit 203, executing a program stored in a memory or the like. However, this is merely an example, and processing to be described later may partially or wholly be implemented by dedicated hardware. In addition, processing executed by the detachable device 100 or the input/output apparatus 130 may also be implemented by, by a processor in each apparatus, executing a program stored in a memory or the like, and processing may partially or wholly be implemented by dedicated hardware.

(Overall Procedure)

Figure 8:
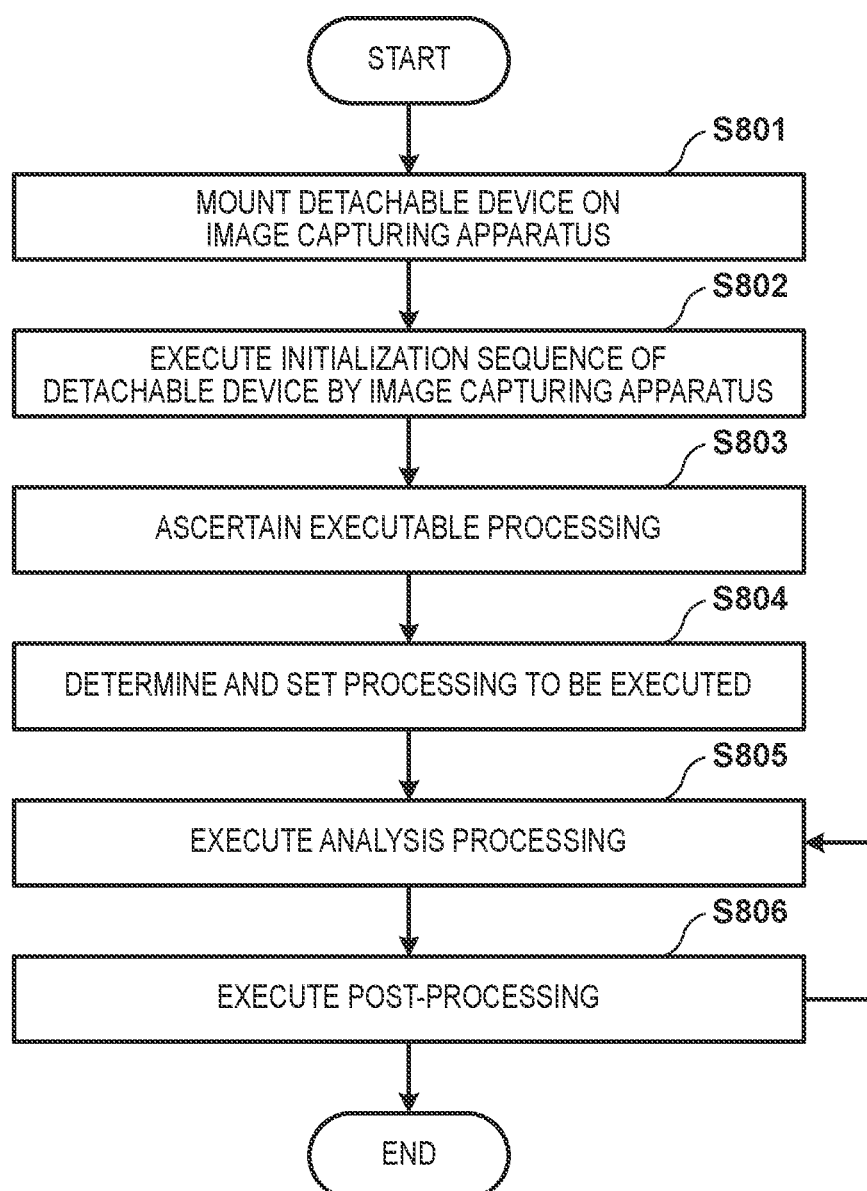
FIG. 8 is a flowchart showing an example of the procedure of processing executed by the system.

FIG. 8 schematically shows a series of procedures of image analysis processing executed by the system. In this processing, first, the user mounts the detachable device 100 on the image capturing apparatus 110 (step S801). The image capturing apparatus 110 executes an initialization sequence of the detachable device 100 (step S802). In this initialization sequence, predetermined commands are transmitted/received between the image capturing apparatus 110 and the detachable device 100, and the image capturing apparatus 110 thus makes the detachable device 100 usable. After that, the image capturing apparatus 110 ascertains processing executable by the detachable device 100, and ascertains processing that can be executed locally (that can be executed only by the image capturing apparatus 110 or by the combination of the image capturing apparatus 110 and the detachable device 100) (step S803). Note that although the detachable device 100 can be configured to execute arbitrary processing, processing irrelevant to processing that should be executed on the side of the image capturing apparatus 110 need not be taken into consideration. In an example, the image capturing apparatus 110 may hold a list of executable processes, which is obtained in advance from, for example, the input/output apparatus 130. In this case, when obtaining, from the detachable device 100, information representing processing executable by the detachable device 100, the image capturing apparatus 110 can ascertain only the executable processing depending on whether the processing is included in the list. Next, the image capturing apparatus 110 determines processing to be executed, and executes setting of the detachable device 100 as needed (step S804). That is, if at least part of processing determined as an execution target is to be executed by the detachable device 100, setting of the detachable device 100 for the processing is executed. In this setting, for example, reconfiguration of the FPGA 402 using setting data corresponding to the processing of the execution target can be performed. Then, the image capturing apparatus 110 or the detachable device 100 executes analysis processing (step S805). After that, the image capturing apparatus 110 executes post-processing (step S806). Note that the processes of steps S805 and S806 are repetitively executed. The processing shown in FIG. 8 is executed when, for example, the detachable device 100 is mounted. However, at least part of the processing shown in FIG. 8 may repetitively be executed such that, for example, the process of step S803 is executed again when the detachable device 100 is detached.

(Processing of Ascertaining Executable Processing)

Figure 9:
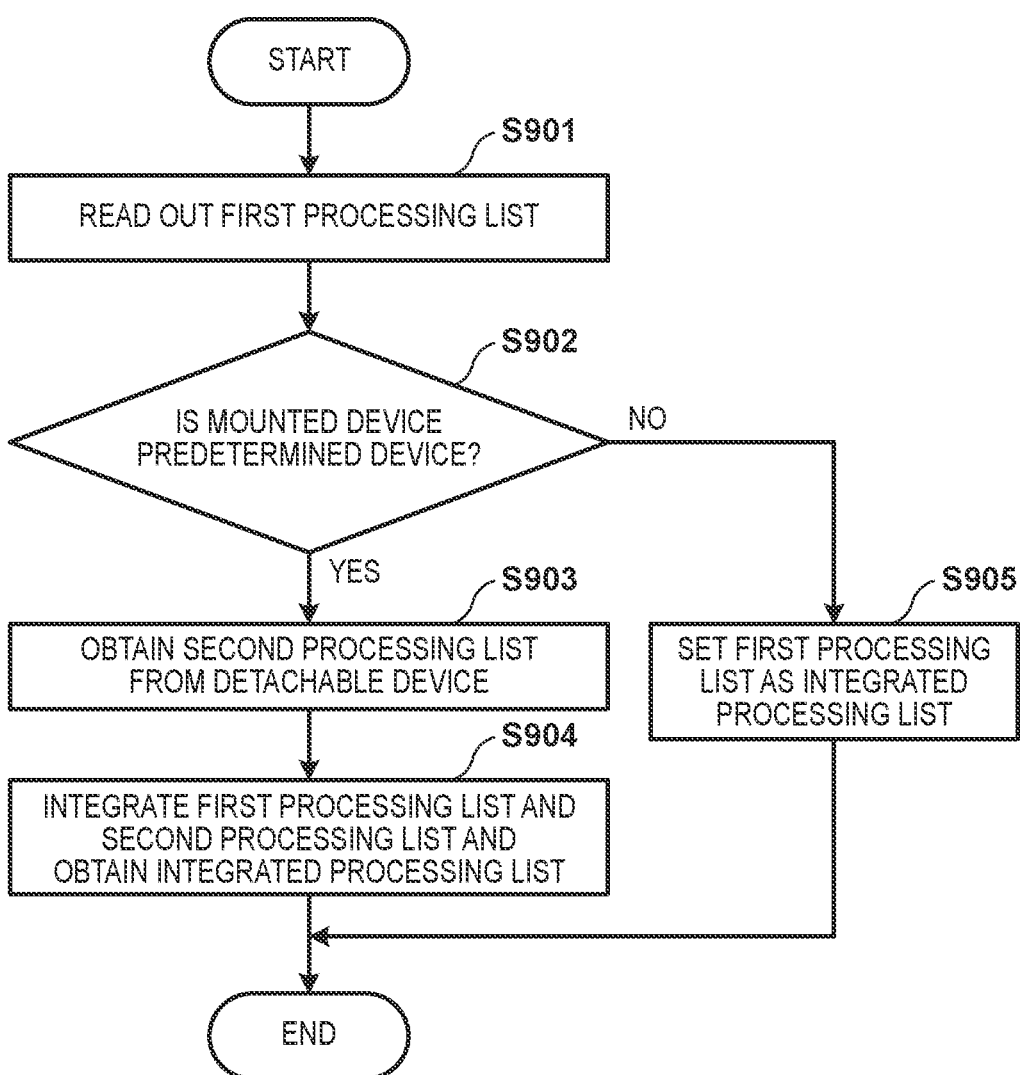
FIG. 9 is a flowchart showing an example of the procedure of processing of ascertaining analysis processing.

FIG. 9 shows an example of the procedure of processing of ascertaining processing executable by the image capturing apparatus 110. This processing corresponds to the process of step S803 in FIG. 8, and can be executed if a device such as the detachable device 100 is mounted on the image capturing apparatus 110 or removed from the image capturing apparatus 110, or if the image capturing apparatus 110 is powered on. In this processing, the image capturing apparatus 110 reads out processing executable by the detachable device 100, integrates it with analysis processing executable by the image capturing apparatus 110 itself, and ascertains analysis processing executable on the side of the image capturing apparatus 110.

First, the control unit 304 of the image capturing apparatus 110 reads out a first processing list that is a list of processes executable by the analysis unit 305 of the image capturing apparatus 110 itself, which is stored in the storage unit 303 (step S901). Next, the control unit 304 determines whether the mounted device is, for example, a conventional device having only a storage function of a predetermined device such as the detachable device 100 having a specific processing function (step S902). For example, the control unit 304 controls the device communication unit 306 to issue a read request (read command) for a specific address to the mounted device and read out flag data stored at the specific address. The control unit 304 can determine, based on the read flag data, whether the detachable device 100 is a predetermined device having a specific processing function. However, this is merely an example, and it may be determined by another method whether the mounted device is a predetermined device.

If the mounted device is a predetermined device (YES in step S902), the control unit 304 executes processing of ascertaining processing executable in the device (detachable device 100). The control unit 304 controls the device communication unit 306 to communicate with detachable device 100 and obtain a list (to be referred to as a "second processing list" hereinafter) of processes executable in the detachable device 100 (step S903). The control unit 304 reads out the data stored at the specific address as in a case in which, for example, it is determined whether the detachable device 100 is a predetermined device, thereby obtaining the second processing list. Note that, for example, the second processing list can be stored at the same address as the flag data used to determine whether the detachable device is a predetermined device. In this case, the image capturing apparatus 110 can simultaneously execute the process of step S902 and the process of step S903 by accessing the address and simultaneously obtaining the flag data and the second processing list. However, the present invention is not limited to this, and these data may be stored at different addresses. After that, the control unit 304 creates an integrated processing list in which the first processing list of processes executable by the image capturing apparatus 110 itself, which is read out from the storage unit 303, and the second processing list obtained from the detachable device are integrated (step S904), and ends the processing.

The integrated processing list represents a list of processes locally executable on the side of the image capturing apparatus 110 without performing processing by an apparatus such as a server apparatus on the network. Note that in this embodiment, the integrated processing list is a list obtained by the union of the processes included in the first processing list and the processes included in the second processing list. The integrated processing list is the list of processes included in at least one of the first processing list and the second processing list. However, the present invention is not limited to this. For example, if another process can be executed by combining a process included in the first processing list and a process included in the second processing list, the other executable processing may be added to the integrated processing list.

If the mounted device is not a predetermined device (NO in step S902), the control unit 304 determines that there is no processing executable by the mounted device. Hence, the control unit 304 sets the first processing list of processes executable by the self-apparatus, which is read out from the storage unit 303, as the integrated processing list representing processes locally executable on the side of the image capturing apparatus 110 (step S905), and ends the processing. Note that when the processing shown in FIG. 9 is executed at the time of device removal, the predetermined device is not mounted, as a matter of course, and therefore, the first processing list is handled as the integrated processing list.

This makes it possible to form a list of processes locally executable on the side of the image capturing apparatus 110 based on whether the detachable device 100 capable of executing specific processing is mounted in the image capturing apparatus 110. In addition, when the integrated processing list is presented to the user, as will be described later, the user can select processing that becomes locally executable on the side of the image capturing apparatus 110 by the mounting of the detachable device 100.

(Processing of Determining Analysis Processing Contents)

Figure 10:
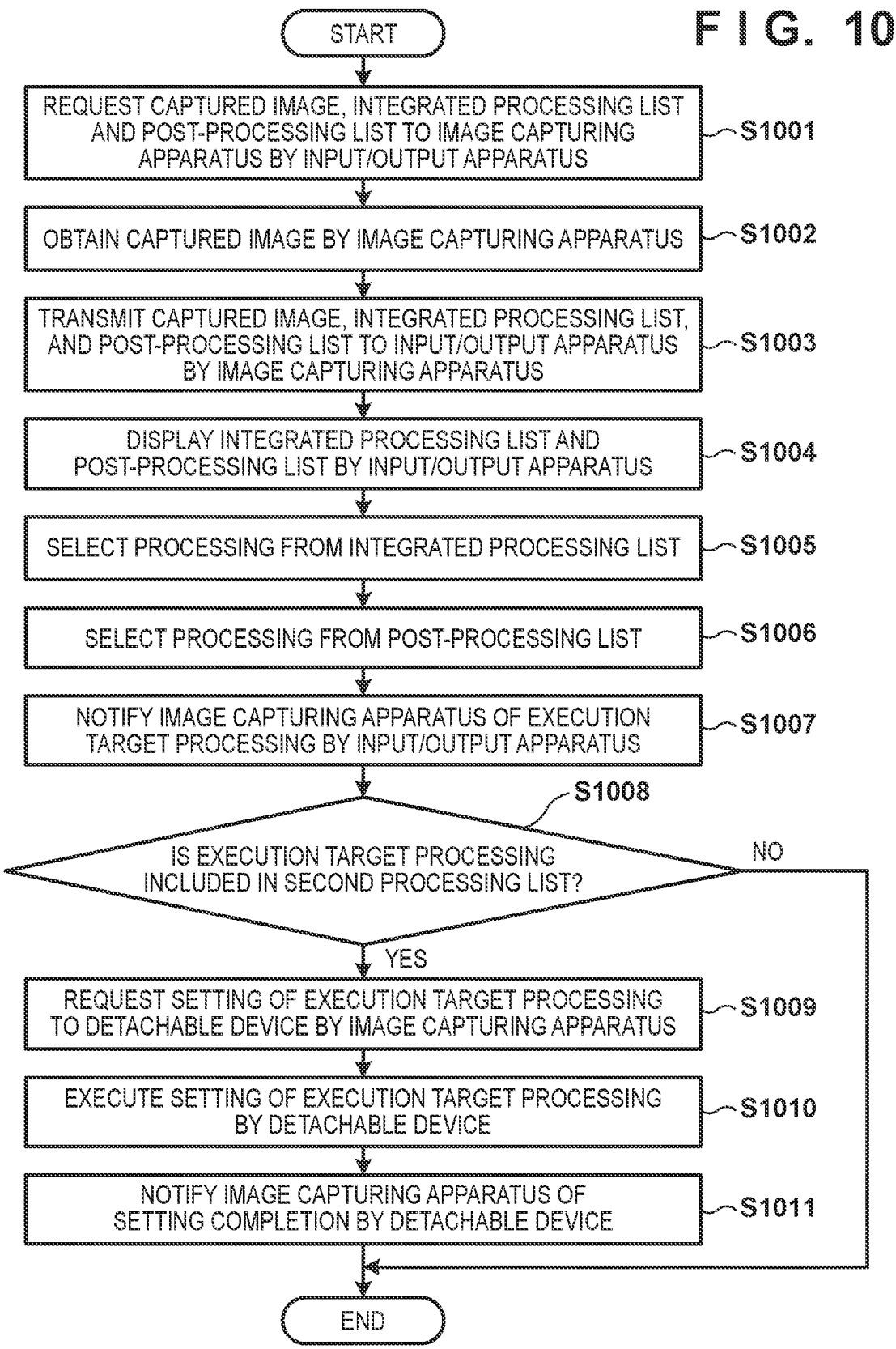
FIG. 10 is a flowchart showing an example of the procedure of processing of determining the contents of analysis processing.

FIG. 10 shows an example of the procedure of processing of determining analysis processing contents by the image capturing apparatus 110. In this processing, analysis processing locally executable on the side of the image capturing apparatus 110 is presented to the user via the input/output apparatus 130, and the input/output apparatus 130 accepts selection of the user. The image capturing apparatus 110 determines analysis processing to be executed in accordance with information representing the user selection accepted via the input/output apparatus 130.

In this processing, first, the input/output apparatus 130 executes communication with the image capturing apparatus 110 and requests obtaining of a captured image, an integrated processing list, and a post-processing list (step S1001). As an example, the input/output apparatus 130 transmits a request message defined by the ONVIF standard to the image capturing apparatus 110, thereby requesting transmission of information to the image capturing apparatus 110. However, the present invention is not limited to this, and the information transmission request may be done by another message or the like. In the image capturing apparatus 110, based on the request, the image capturing control unit 301 captures the peripheral environment, and the control unit 304 controls the signal processing unit 302 to process an image captured by the image capturing control unit 301 and obtain a captured image (step S1002). Note that the image capturing apparatus 110 may capture the peripheral environment independently of the presence/absence of the request and continuously obtain a captured image. The image capturing apparatus 110 may locally store the captured image or transfer the captured image to another apparatus such as a network server and store. The control unit 304 reads out a post-processing list stored in the storage unit 303. In this embodiment, the post-processing list includes display processing and storage processing but is not limited to this. The control unit 304 controls the network communication unit 307 to transmit the post-processing list, an integrated processing list obtained by the processing shown in FIG. 7, and the captured image obtained in step S1002 to the input/output apparatus 130 (step S1003). As an example, the image capturing apparatus 110 transmits a response message to the request message defined by the above-described ONVIF standard to the input/output apparatus 130, thereby transmitting the information to the input/output apparatus 130. However, the present invention is not limited to this, and the information may be transmitted by another message or the like. Note that only processing to be executed may be taken into consideration here, and the captured image request by the input/output apparatus 130 in step S1001, the captured image obtaining in step S1002, and captured image transmission to the input/output apparatus 130 in step S1003 may not be performed.

The input/output apparatus 130 receives the captured image, the integrated processing list, and the post-processing list from the image capturing apparatus 110. The input/output apparatus 130 then presents the integrated processing list and the post-processing list to the user by screen display or the like (step S1004). Note that at this time, the input/output apparatus 130 may also present the captured image to the user by screen display or the like. After that, the user confirms the integrated processing list and the post-processing list, which are displayed, and selects analysis processing to be executed (to be referred to as "execution target processing" hereinafter) from the integrated processing list (step S1005). In addition, the user selects a post-processing to be executed (to be referred to as "execution target post-processing" hereinafter) (step S1006). The input/output apparatus 130 transmits information representing the execution target processing and the execution target post-processing to the image capturing apparatus 110 (step S1007).

The control unit 304 of the image capturing apparatus 110 controls the network communication unit 307 to receive the information representing the execution target processing selected by the user from the input/output apparatus 130 and determine whether the execution target processing is processing included in the second processing list (step S1008). If the execution target processing is not included in the second processing list (NO in step S1008), the control unit 304 ends the processing shown in FIG. 10 without making a notification to the detachable device 100 to execute the processing in the image capturing apparatus 110. On the other hand, if the execution target processing is included in the second processing list (YES in step S1008), the control unit 304 controls the device communication unit 306 to transfer an execution target processing setting request to the detachable device 100 (step S1009).

The communication unit 502 of the detachable device 100 receives the execution target processing setting request from the image capturing apparatus 110. The communication unit 502 outputs the execution target processing setting request received from the image capturing apparatus 110 to the analysis unit 501.

Based on the execution target processing setting request input from the communication unit 502, the analysis unit 501 obtains settings of execution target processing from the storage unit 503, and executes setting to set the detachable device 100 in a state in which the execution target processing can be executed (step S1010). For example, after the completion of the setting processing, the communication unit 502 transmits a setting completion notification to the image capturing apparatus 110 (step S1011). Note that the communication unit 502 need only notify information for inhibiting the image capturing apparatus 110 from writing data at a timing at which the setting of the detachable device 100 is not completed yet, and may notify the image capturing apparatus 110 of the information of the setting completion timing or the like before the setting is actually completed. The control unit 304 of the image capturing apparatus 110 controls the device communication unit 306 to receive the setting completion notification from the detachable device 100.

The setting completion notification from the detachable device 100 to the image capturing apparatus 110 can be executed using, for example, one of the following three methods. In the first notification method, the communication unit 502 outputs a BUSY signal in a case in which the setting of the execution target processing has not ended at the time of write processing of the data of the first block from the image capturing apparatus 110. Output of the BUSY signal is performed by, for example, driving a signal line of DATA defined by the SD standard to a Low state. In this case, the image capturing apparatus 110 confirms the BUSY signal, thereby discriminating whether the setting of the execution target processing is completed. In the second notification method, the time until setting of the execution target processing is completed is stored in advance at the above-described specific address, and the image capturing apparatus 110 reads out the information of the time until the setting completion. After the elapse of the time until the execution target processing setting completion, the image capturing apparatus 110 outputs write data (issues a write command). This allows the image capturing apparatus 110 to transmit the data of the captured image after the setting of the execution target processing is completed. In the third notification method, when the setting of the execution target processing is completed, the analysis unit 501 writes a setting completion flag at a second specific address of the detachable device 100. The image capturing apparatus 110 reads out the data at the second specific address, thereby discriminating whether the setting of the execution target processing is completed. Note that the information of the address at which the setting completion flag is written may be stored at the above-described specific address or may be stored at another address.

(Execution Control of Analysis Processing)

Figure 11:
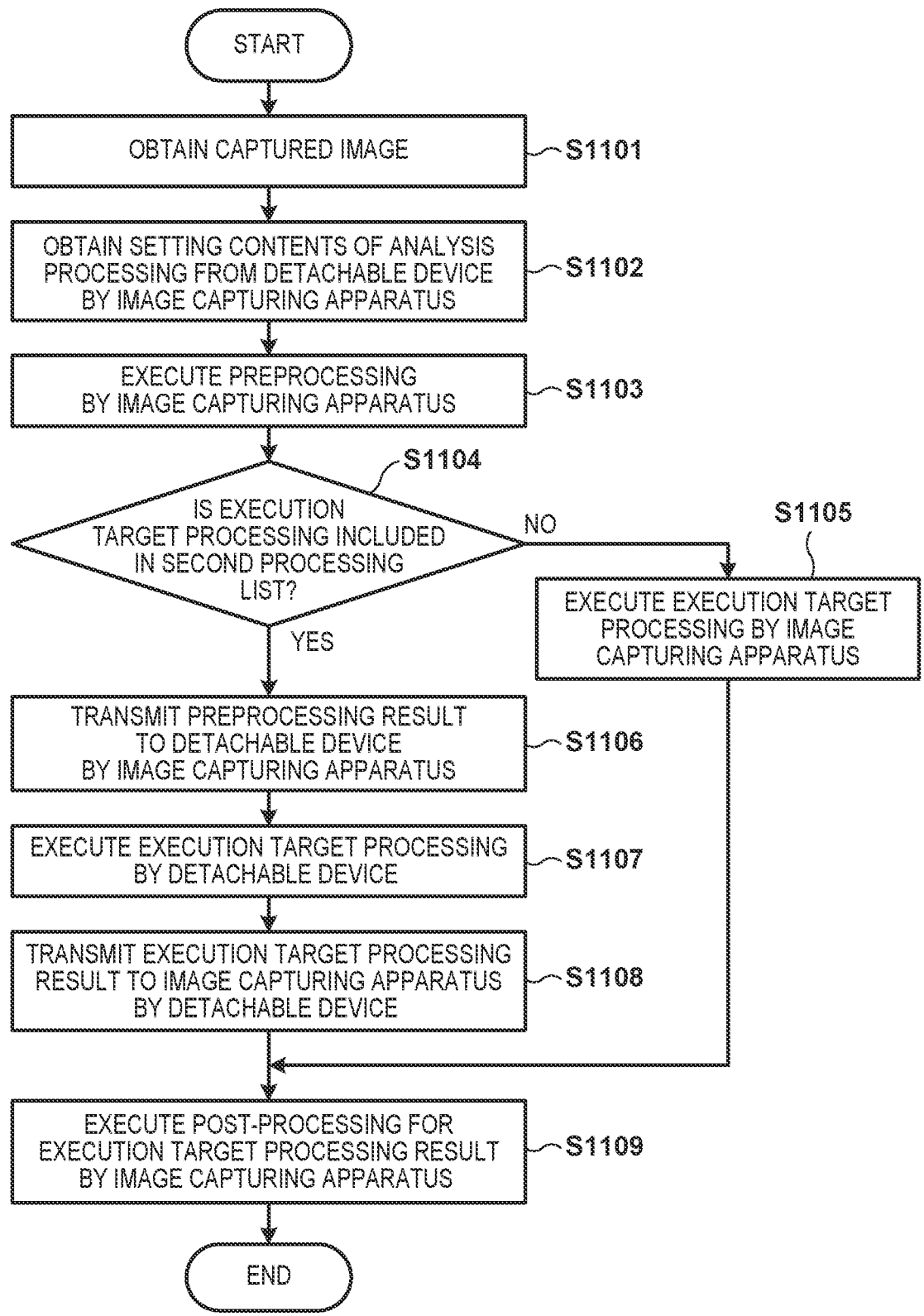
FIG. 11 is a flowchart showing an example of the procedure of control of executing analysis processing.

FIG. 11 shows an example of the procedure of control when the image capturing apparatus 110 executes analysis processing. In this processing, first, the image capturing control unit 301 captures the peripheral environment (step S1101). The control unit 304 controls the signal processing unit 302 to process an image captured by the image capturing control unit 301 and obtain a captured image. After that, the control unit 304 controls the device communication unit 306 to obtain the setting contents of pre-analysis processing and post-analysis processing from the detachable device 100 (step S1102). After that, under the control of the control unit 304, based on the setting contents of pre-analysis processing obtained from the detachable device 100, the analysis unit 305 executes pre-analysis processing for the captured image input from the control unit 304 and obtains the image of the pre-analysis processing result (step S1103). The control unit 304 determines whether the execution target processing is included in the second processing list (step S1104).

Upon determining that the execution target processing is not included in the second processing list (NO in step S1104), the control unit 304 controls the analysis unit 305 to execute the execution target processing for the image of the pre-analysis processing result in the image capturing apparatus 110 (step S1105). The control unit 304 controls the analysis unit 305 to execute post-analysis processing for the analysis processing result based on the setting contents of post-analysis processing obtained from the detachable device 100 (step S1109), and ends the processing.

If the execution target processing is included in the second processing list (YES in step S1104), the control unit 304 controls the device communication unit 306 to transmit the image of the pre-analysis processing result to the detachable device 100 (step S1106). For example, the control unit 304 issues a write request (write command) of the pre-analysis processing result, thereby transmitting the image of the pre-analysis processing result to the detachable device 100. The communication unit 502 of the detachable device 100 receives the image of the pre-analysis processing result from the image capturing apparatus 110, and outputs the image received from the image capturing apparatus 110 to the analysis unit 501. The analysis unit 501 executes the execution target processing set in step S1010 of FIG. 10 for the image input from the communication unit 502 (step S1107). Then, the communication unit 502 transmits the analysis processing result obtained by the processing of the analysis unit 501 to the image capturing apparatus 110 (step S1108). The control unit 304 of the image capturing apparatus 110 controls the device communication unit 306 to receive the analysis processing result from the detachable device 100. After that, the control unit 304 controls the analysis unit 305 to execute post-analysis processing for the analysis processing result based on the setting contents of pre-analysis processing obtained from the detachable device 100 (step S1109).

(Execution Control of Post-Processing)

Figure 12:
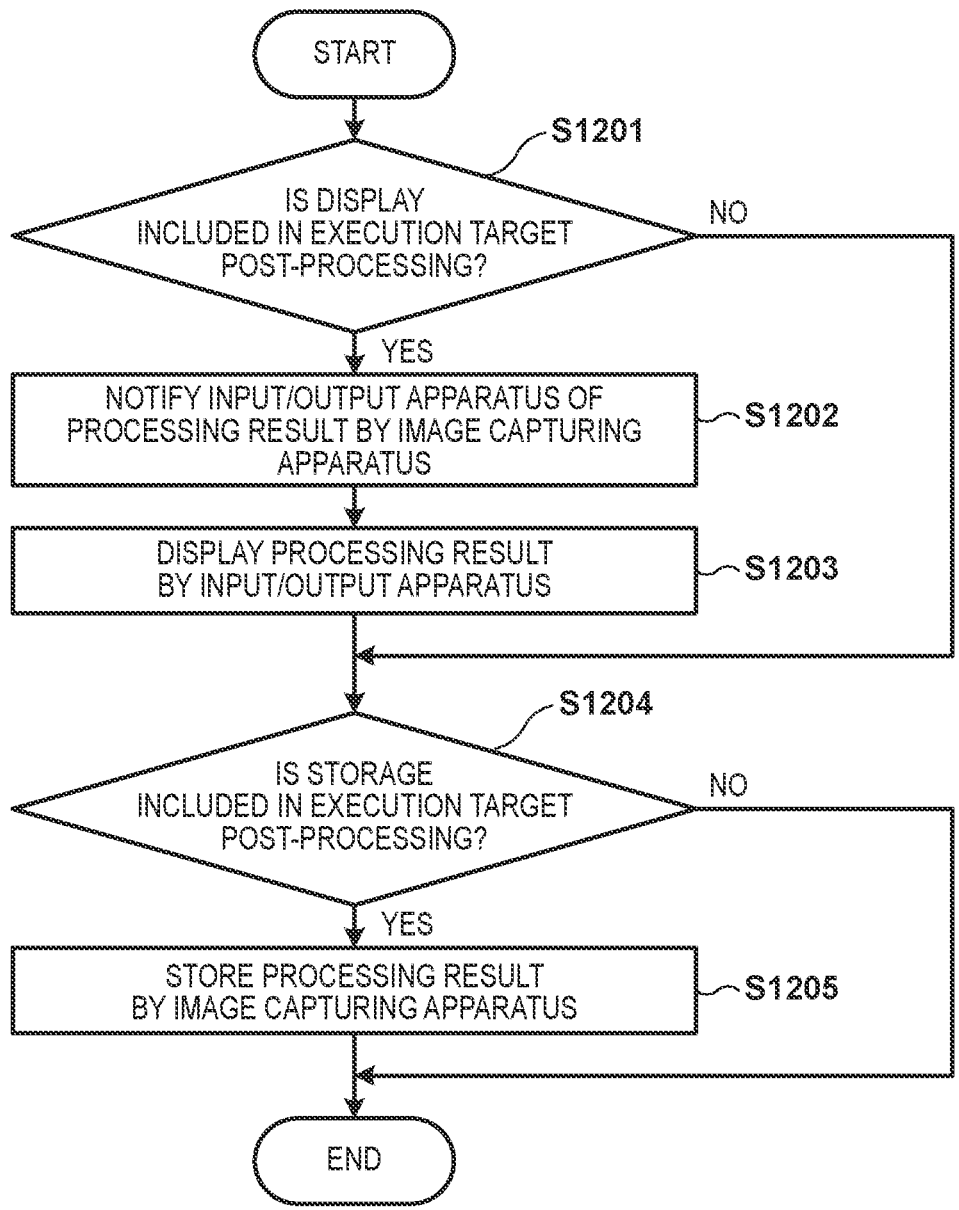
FIG. 12 is a flowchart showing an example of the procedure of control of executing post-processing.

FIG. 12 shows an example of the procedure of control when the image capturing apparatus 110 executes post-processing. In this processing, the control unit 304 of the image capturing apparatus 110 determines whether "display" is included in the execution target post-processing (step S1201). Upon determining that display is included in the execution target post-processing (YES in step S1201), the control unit 304 controls the network communication unit 307 to transmit the result of analysis processing to the input/output apparatus 130 (step S1202). The input/output apparatus 130 receives the result of analysis processing from the image capturing apparatus 110, and then presents the result of analysis processing to the user by screen display or the like (step S1203). On the other hand, if the control unit 304 determines that display is not included in the execution target post-processing (NO in step S1201), the processes of steps S1202 and S1203 are not executed.

In addition, the control unit 304 of the image capturing apparatus 110 determines whether "storage" is included in the execution target post-processing (step S1204). Note that the determination of step S1204 may be executed before step S1201 or may be executed in parallel to the step S1201. Upon determining that storage is included in the execution target post-processing (YES in step S1204), the control unit 304 controls the storage unit 303 to store the result of analysis processing and ends the processing. On the other hand, upon determining that storage is not included in the execution target post-processing (NO in step S1204), the control unit 304 ends the processing without executing the process of step S1205.

In this embodiment, as described above, when causing the detachable device 100 to partially or wholly execute analysis processing, the image capturing apparatus 110 obtains the setting contents of pre-analysis processing and post-analysis processing corresponding to those processes from the detachable device 100. The image capturing apparatus 110 executes pre-analysis processing based on the obtained setting contents of pre-analysis processing, causes the detachable device 100 to execute analysis processing, and executes post-analysis processing for the result based on the obtained setting contents of post-analysis processing. Hence, even if analysis processing executable by the detachable device 100 changes, the image capturing apparatus 110 can execute appropriate pre-analysis processing and post-analysis processing without changing the functional arrangement of the image capturing apparatus 110. That is, for example, in first analysis processing and second analysis processing, which are different from each other, settings such as whether color conversion needs to be performed in advance and the size of an image that should be input may be different. At this time, if uniform pre-analysis processing is executed, input that is not appropriate is done in at least one of the first analysis processing and the second analysis processing, and degradation of processing efficiency, a processing failure, and the like may occur. On the other hand, in this embodiment, it is possible to execute pre-analysis processing corresponding to processing to be executed by the detachable device 100. Similarly, when performing display processing concerning the first analysis processing and the second analysis processing, different post-analysis processing can be executed by, for example, executing alpha blend for a region where an object is detected or highlighting the region using a rectangular pattern. At this time, in this embodiment, it is possible to execute post-analysis processing corresponding to processing to be executed by the detachable device 100. Hence, if the execution target processing has changed by, for example, replacement of the detachable device 100, rewrite of circuit information of the FPGA in the detachable device 100, or the like, the image capturing apparatus 110 can change the settings of pre-analysis processing and post-analysis processing in accordance with the change of the processing. Note that the detachable device 100 may notify the image capturing apparatus 110 of the setting information of only one of preprocessing and post-processing.

Note that in this embodiment, the setting contents notified from the detachable device 100 to the image capturing apparatus 110 are the setting contents of pre-analysis processing and post-analysis processing. However, the setting contents may be, for example, the setting contents of each analysis processing included in the second processing list. For example, setting contents concerning image analysis processing to be executed cooperatively by the detachable device 100 and the image capturing apparatus 110 may be notified from the detachable device 100 to the image capturing apparatus 110. The setting contents of analysis processing can be the type and parameters of analysis processing. Here, the analysis processing may include inference processing by a learning model that has completed learning using by machine learning. At this time, as the type of analysis processing for performing analysis of the same type, inference processing by the learning model may be designated, or inference processing that does not use a learning model may be designated. The parameters of analysis processing may be learned parameters of a learning model learned by machine learning. In this case, in parallel to execution of execution target processing by the detachable device 100 in step S1107 of FIG. 11, the image capturing apparatus 110 can execute analysis processing of a type obtained from the detachable device 100 based on parameters obtained from the detachable device 100. This allows the image capturing apparatus 110 to execute analysis processing in cooperation with the detachable device 100 without changing the functional arrangement.

In addition, the setting contents of analysis processing may include a description of analysis processing. In this case, when, for example, obtaining the second processing list in step S903 of FIG. 9, the image capturing apparatus 110 obtains a description about each analysis processing included in the second processing list from the detachable device 100. In step S904, the image capturing apparatus 110 can create an integrated processing list including the description of analysis processing. In addition, in step S1004 of FIG. 10, the input/output apparatus 130 can present the integrated processing list to the user together with the description of each analysis processing. This makes it possible to present analysis processing executable by the detachable device 100 to the user together with a description without changing the functional arrangement of the image capturing apparatus 110.

Additionally, in this embodiment, an example in which the image capturing apparatus 110 directly obtains the setting contents of pre-analysis processing and post-analysis processing from the detachable device 100 has been described. However, the present invention is not limited to this. For example, the image capturing apparatus 110 can obtain identification information of settings from the detachable device 100, and need not obtain the setting contents themselves. In this case, the image capturing apparatus 110 can access, via the network 120, an external apparatus (for example, a server) that stores setting contents, notify the external server of identification information, and obtain setting contents corresponding to the identification information. This can decrease the amount of information notified from the detachable device 100 to the image capturing apparatus 110. Also, when using detailed setting contents with a large data amount, the detachable device 100 need not hold the setting contents, and the storage capacity of the detachable device 100 can be prevented from being pressed.

In the above-described embodiment, image analysis processing has been described as an example of analysis processing. However, the present invention is also applicable to audio analysis processing. For example, the above-described argument can be applied to processing of detecting an audio pattern such as a scream, a gunshot, or glass breaking sound, or in a case in which various kinds of audio processing techniques such as sound source position estimation processing are executed by the detachable device 100. In audio pattern detection processing, for example, the characteristic amounts of various kinds of audios are extracted in advance by various audio data analysis methods such as spectrum analysis, and the characteristic amounts are compared with audio data based on recorded audios. By calculating the degree of matching, it is determined whether a specific audio pattern is detected. In this audio pattern detection processing, for example, when an audio corresponding to a predetermined pattern is detected, post-processing of notifying the user of the detection of the predetermined pattern by screen display or audio guidance can be performed. Also, in sound source position estimation processing, using, for example, an array formed by a plurality of microphones, the position of a sound source is estimated based on the intensity or phase shift of an audio detected by each microphone. In the sound source position estimation processing, processing of executing screen display or audio guidance for guiding a position where a sound source exists can be performed as post-processing. As described above, in the audio processing as well, the setting contents of post-processing can be changed by processing to be executed by the detachable device 100.

Note that when performing audio analysis processing, audio data can be divided into audio data of a predetermined time, and audio analysis processing can be performed using the audio data of the predetermined time as a unit. At this time, the appropriate value of the predetermined time as the division unit may change depending on processing to be executed. For this reason, it is useful to cause the detachable device 100 to notify the image capturing apparatus 110 of setting contents using the processing according to this embodiment such that appropriate preprocessing is executed for each processing. In addition, in audio pattern detection processing, the predetermined time may be different for each audio pattern to be detected. For this reason, the detachable device 100 may notify the image capturing apparatus 110 of setting contents for preprocessing such that audio pattern for each time corresponding to the audio pattern of a detection target is input to the detachable device 100. As described above, if the detachable device 100 has a function of analyzing input audio data or a function of holding input audio data, it is possible to cause the image capturing apparatus 110 to execute appropriate preprocessing and post-processing by applying the above-described processing.

In the above-described embodiment, the detachable device 100 capable of non-temporarily storing data input from the image capturing apparatus 110 has been described as an example. However, in some embodiments, the detachable device 100 that cannot non-temporarily store data input from the image capturing apparatus 110 may be used. That is, the detachable device 100 may only perform analysis processing for data input from the image capturing apparatus 110, and may not non-temporarily store the data. In other words, the above-described argument can be applied to a system in which the detachable device 100 aiming not at storing data, like a normal SD card, but at only analysis processing is used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{TM}$), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-033755, filed Feb. 28, 2020 which is hereby incorporated by reference herein in its entirety.

What is claimed is:

1. An image capturing apparatus including a mounting part capable of attaching/detaching a device, comprising:
a processor; and
a memory storing executable instructions which, when executed by the processor, cause the image capturing apparatus to perform operations including:
obtaining, if a device mounted in the mounting part has a function of executing analysis processing for data obtained by the image capturing apparatus, from the device, information of a setting concerning preprocessing of the analysis processing;
executing the preprocessing for the data based on the obtained information of the setting; and
transmitting a result of the preprocessing to the device.

2. The image capturing apparatus according to claim 1, wherein the preprocessing to be executed by the image capturing apparatus includes processing to be executed by the image capturing apparatus in analysis processing to be executed cooperatively by the device and the image capturing apparatus.

3. The image capturing apparatus according to claim 1, wherein the information of the setting is identification information for identifying a set value, and
the operations further include obtaining a set value of the preprocessing to be executed by the image capturing apparatus from an apparatus different from the device based on the identification information.

4. The image capturing apparatus according to claim 1, wherein the information of the setting includes a set value.

5. The image capturing apparatus according to claim 4, wherein the set value includes information representing a type of the preprocessing to be executed by the image capturing apparatus.

6. The image capturing apparatus according to claim 4, wherein the set value includes a parameter of the preprocessing to be executed by the image capturing apparatus.

7. The image capturing apparatus according to claim 1, wherein the data includes image data based on an image captured by the image capturing apparatus.

8. The image capturing apparatus according to claim 1, wherein the data includes audio data based on an audio recorded by the image capturing apparatus.

9. The image capturing apparatus according to claim 1, wherein the preprocessing to be executed by the image capturing apparatus includes processing of converting a decimal between a floating point format and a fixed point format.

10. A device mounted in an image capturing apparatus including a mounting part capable of attaching/detaching the device, comprising:
a processing circuit; and
a memory storing executable instructions which, when executed by the processing circuit, cause the device to perform operations including:
executing analysis processing for data obtained by the image capturing apparatus if the device is mounted in the image capturing apparatus including the mounting part;
notifying the image capturing apparatus of information of a setting concerning preprocessing of the analysis processing; and
receiving, from the image capturing apparatus, the data which is a result of the preprocessing executed by the image capturing apparatus, wherein the received data is used for the analysis processing.

11. The device according to claim 10, wherein the information of the setting includes a set value of the preprocessing to be executed by the image capturing apparatus.

12. The device according to claim 10, wherein the information of the setting is identification information used by the image capturing apparatus to obtain a set value of the preprocessing to be executed by the image capturing apparatus from an apparatus different from the device.

13. The device according to claim 11, wherein the set value includes information representing a type of the preprocessing to be executed by the image capturing apparatus.

14. The device according to claim 11, wherein the set value includes a parameter of the preprocessing to be executed by the image capturing apparatus.

15. The device according to claim 10, wherein the data includes image data based on an image captured by the image capturing apparatus.

16. The device according to claim 10, wherein the data includes audio data based on an audio recorded by the image capturing apparatus.

17. The device according to claim 10, wherein the preprocessing to be executed by the image capturing apparatus includes processing of converting a decimal between a floating point format and a fixed point format.

18. A control method executed by an image capturing apparatus including a mounting part capable of attaching/detaching a device, the method comprising:
- if a device mounted in the mounting part has a function of executing analysis processing for data obtained by the image capturing apparatus, obtaining, from the device, information of a setting concerning preprocessing of the analysis processing;
- executing the preprocessing for the data based on the obtained information of the setting; and
- transmitting a result of the preprocessing to the device.

19. A control method executed by a device mounted in an image capturing apparatus, comprising:
- executing analysis processing for data obtained by the image capturing apparatus, which includes a mounting part capable of attaching/detaching the device, if the device is mounted in the image capturing apparatus including the mounting part;
- notifying the image capturing apparatus of information of a setting concerning preprocessing of the analysis processing; and
- receiving, from the image capturing apparatus, the data which is a result of the preprocessing executed by the image capturing apparatus, wherein the received data is used for the analysis processing.

20. A non-transitory computer-readable storage medium that stores a program for causing a computer included in an image capturing apparatus that includes a mounting part capable of attaching/detaching a device to:
- if a device mounted in the mounting part has a function of executing analysis processing for data obtained by the image capturing apparatus, obtain, from the device, information of a setting concerning preprocessing of the analysis processing,
- execute the preprocessing for the data based on the obtained information of the setting; and
- transmit a result of the preprocessing to the device.

21. A non-transitory computer-readable storage medium that stores a program for causing a computer included in a device, which is mounted in an image capturing apparatus, to:
- execute analysis processing for data obtained by the image capturing apparatus, which includes a mounting part capable of attaching/detaching the device, if the device is mounted in the image capturing apparatus including the mounting part;
- notify the image capturing apparatus of information of a setting concerning preprocessing of the analysis processing; and
- receive, from the image capturing apparatus, the data which is a result of the preprocessing executed by the image capturing apparatus, wherein the received data is used for the analysis processing.

* * * * *